(12) United States Patent
Chiu et al.

(10) Patent No.: US 11,880,332 B2
(45) Date of Patent: Jan. 23, 2024

(54) BUS SYSTEM WITH CONTROLLABLE COMMUNICATION PRIORITY

(71) Applicant: Nuvoton Technology Corporation, Hsinchu Science Park (TW)

(72) Inventors: Kang-Fu Chiu, Hsinchu (TW); Chih-Hung Huang, New Taipei (TW); Hao-Yang Chang, Houlong Township, Miaoli County (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 90 days.

(21) Appl. No.: 17/687,014

(22) Filed: Mar. 4, 2022

(65) Prior Publication Data

US 2023/0205725 A1  Jun. 29, 2023

(30) Foreign Application Priority Data

Dec. 23, 2021  (TW) .................................. 110148331

(51) Int. Cl.
  *G06F 13/42*  (2006.01)
  *G06F 1/12*  (2006.01)
  *G06F 13/362*  (2006.01)
(52) U.S. Cl.
  CPC ............ *G06F 13/4291* (2013.01); *G06F 1/12* (2013.01); *G06F 13/362* (2013.01); *G06F 13/4282* (2013.01)
(58) Field of Classification Search
  CPC ..... G06F 13/4291; G06F 1/12; G06F 13/4282
  See application file for complete search history.

(56) References Cited

U.S. PATENT DOCUMENTS

| 2016/0192360 | A1 | 6/2016 | Lee et al. |
| 2019/0361833 | A1* | 11/2019 | Huang ................ G06F 13/4291 |
| 2021/0081341 | A1 | 3/2021 | Chiu et al. |
| 2021/0138232 | A1 | 5/2021 | Paz et al. |

FOREIGN PATENT DOCUMENTS

TW        202143651 A     11/2021

OTHER PUBLICATIONS

Office Action dated Oct. 11, 2022 issued in corresponding Taiwan Application No. 110148331.

* cited by examiner

*Primary Examiner* — Glenn A. Auve
(74) *Attorney, Agent, or Firm* — MUNCY, GEISSLER, OLDS &LOWE, PC (57) ABSTRACT

A bus system is provided. A plurality of slave devices are electrically connected to a master device through an enhanced serial peripheral interface (eSPI) bus. The slave devices are electrically connected together via a control line. A first slave device is configured to provide a first clock signal to each second slave device via the control line, so that a second clock signal of each second slave device is synchronized with the first clock signal. After the second clock signals are synchronized with the first clock signal, each second slave device is configured to adjust a phase of the second clock signal in a clock phase shift stage, so that each second clock signal has a phase difference with the first clock signal. The phase differences between the second clock signals of the second slave devices and the first clock signal are different.

20 Claims, 6 Drawing Sheets

BUS SYSTEM WITH CONTROLLABLE COMMUNICATION PRIORITY

CROSS REFERENCE TO RELATED APPLICATIONS

This Application claims priority of Taiwan Patent Application No. 110148331, filed on Dec. 23, 2021, the entirety of which is incorporated by reference herein.

BACKGROUND OF THE INVENTION

Field of the Invention

The invention relates to a bus system, and more particularly to a bus system including a plurality of slave devices.

Description of the Related Art

In a conventional computer system, a chip set such as a south bridge chip is electrically connected to another external circuit module (such as a system-on-a-chip (SoC) with various functions) through a low pin count (LPC) interface. The external circuit modules coupled through the LPC interface are respectively assigned to different independent addresses. As a result, the south bridge chip can communicate with the external circuit modules using one-to-many communication. However, in recent years, new bus architectures, such as the enhanced serial peripheral interface (eSPI) bus, began only allowing a one-to-one communication mechanism to be employed between a chip set and the external circuit modules.

Therefore, a scheme capable of scheduling a plurality of circuit modules of a bus is desirable.

BRIEF SUMMARY OF THE INVENTION

Bus systems are provided. An embodiment of a bus system is provided. The bus system includes a master device, an enhanced serial peripheral interface (eSPI) bus, and a plurality of slave devices electrically connected to the master device via the eSPI bus. Each of the slave devices has a pin, and the pins of the slave devices are electrically connected together via a control line. A first slave device is configured to provide a first clock signal to each second slave device via the control line, so that the second clock signal of each of the second slave devices is synchronized with the first clock signal. After the second clock signals are synchronized with the first clock signal, each of the second slave devices is configured to adjust the phase of the second clock signal in the clock phase shift stage, so that each of the second clock signals has a phase difference with the first clock signal. The phase differences between the second clock signals of the second slave devices and the first clock signal are different.

Moreover, an embodiment of a bus system is provided. The bus system includes a master device, an enhanced serial peripheral interface (eSPI) bus, and a plurality of slave devices electrically connected to the master device via the eSPI bus. Each of the slave devices has a pin, and the pins of the slave devices are electrically connected together via a control line. The slave devices determine whether to communicate with the master device via the eSPI bus by driving the control line. After the first slave device provides a first clock signal to each second slave device via the control line, each of the second slave devices is configured to control the phase difference between the second clock signal and the first clock signal. The phase differences between the second clock signal of each of the second slave devices and the first clock signal are different.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
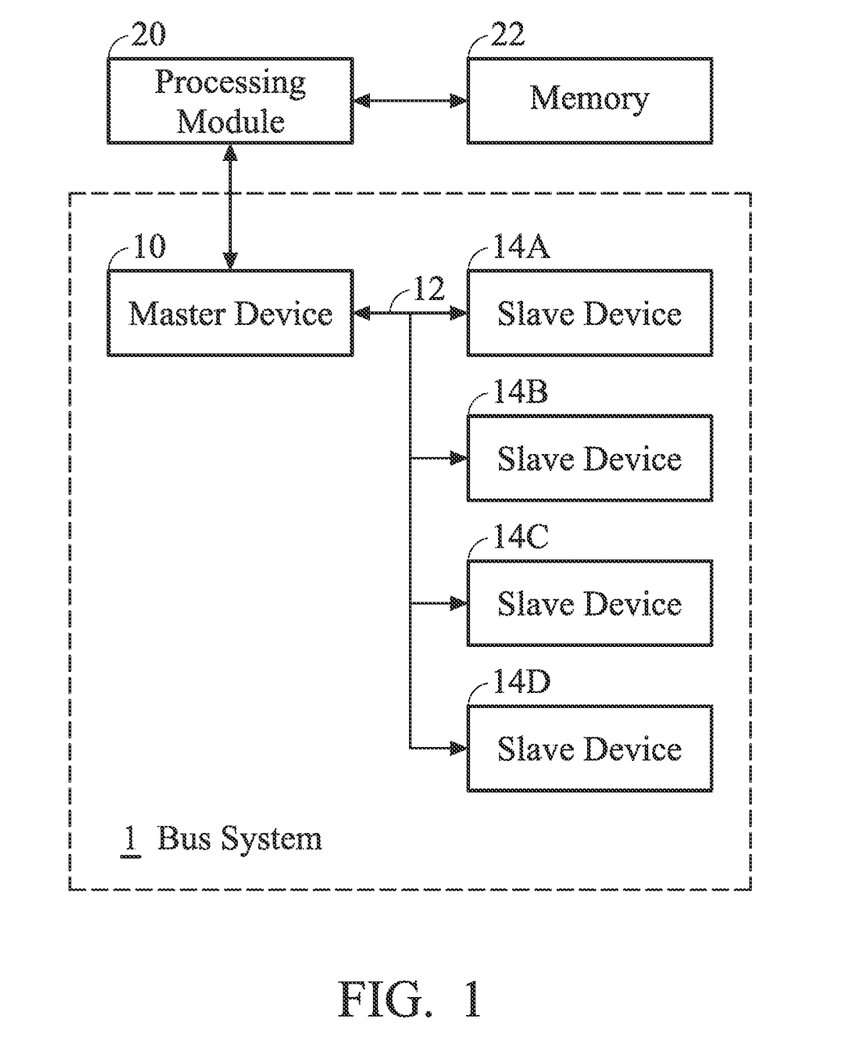
FIG. 1 shows a bus system according to some embodiments of the invention.

FIG. 1 shows a bus system 1 according to some embodiments of the invention. The bus system 1 includes a master device 10, a bus 12, and a plurality of slave devices 14A through 14D. In some embodiments, the master device 10 may be a south bridge chip. In some embodiments, the master device 10 is electrically connected to a processing module 20 of a computer system (not shown), so as to access data with the slave devices 14A through 14D via the bus 12 in response to instruction of the processing module 20. In some embodiments, the processing module 20 is electrically connected to a memory 22 of a computer system, so as to access the memory 22 according to the requests of different application programs. In some embodiments, the bus 12 may be an enhanced serial peripheral interface (eSPI) bus. The master device 10 is electrically connected to the slave devices 14A through 14D via the bus 12. Furthermore, the master device 10 is configured to perform communication with the slave devices 14A through 14D by using a one-to-one communication mechanism, and the slave devices 14A through 14D are configured to communicate with the master device 10 by using an arbitration mechanism. It should be noted that the number of slave devices 14A through 14D as illustrated is used as an example, and not to limit the invention.

Figure 2:
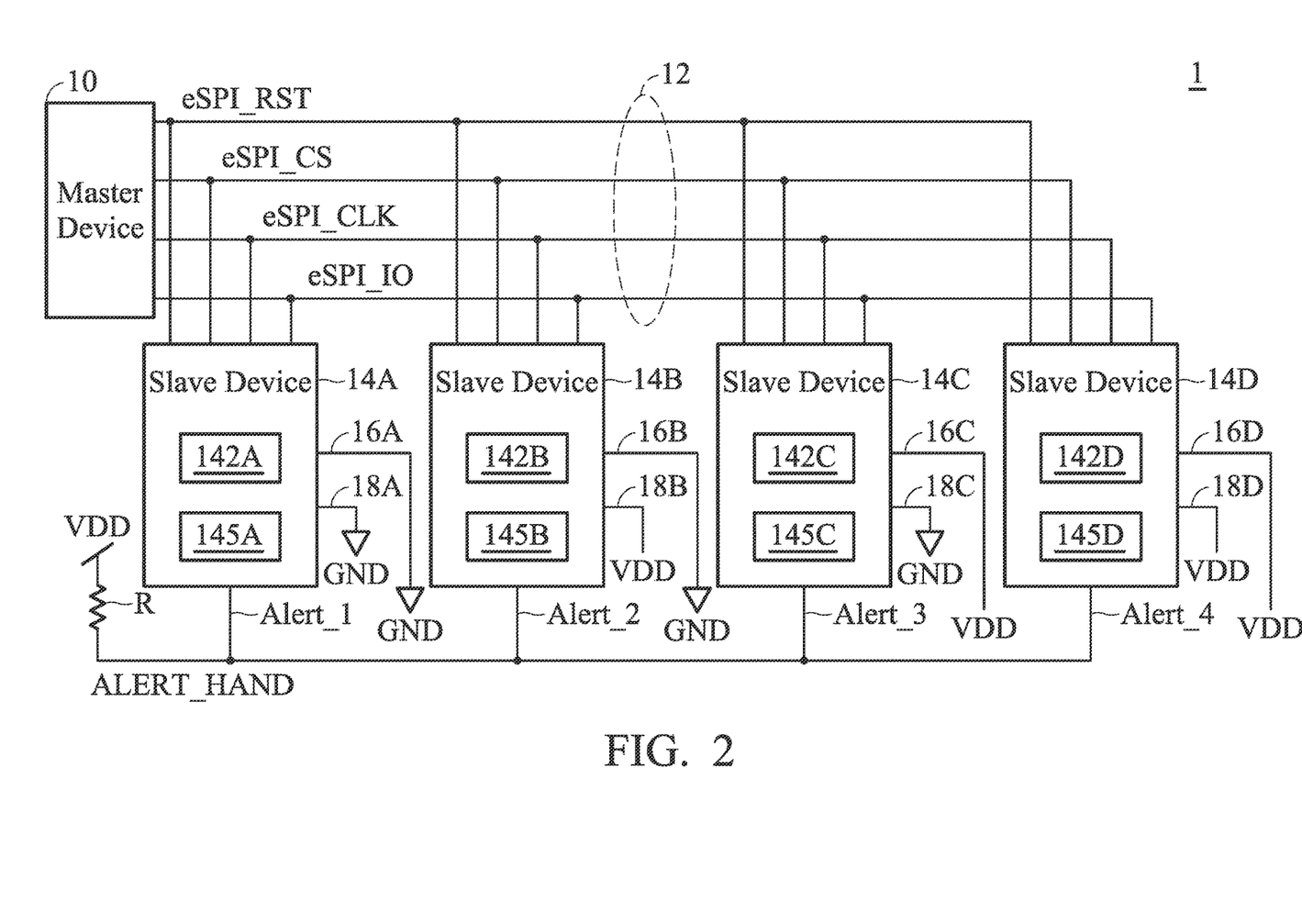
FIG. 2 shows the connection configuration of the bus system in FIG. 1 according to some embodiments of the invention.

FIG. 2 shows the connection configuration of the bus system 1 in FIG. 1 according to some embodiments of the invention. In the embodiment, the bus 12 includes a reset signal line eSPI_RST, a chip select signal line eSPI_CS, a clock signal eSPI_CLK and an input/output signal line eSPI_IO. The master device 10 is configured to perform the communication with the slave devices 14A through 14D via the chip select signal line eSPI_CS based on one-to-one communication mechanism. Furthermore, based on the arbitration mechanism, the slave devices 14A through 14D are configured to perform the communication (e.g., data and instruction transmission) with the master device 10 via the input/output signal line eSPI_IO. When the master device 10 communicates with the slave devices 14A through 14D via the bus 12, the clock signal eSPI_CLK is used as a reference clock.

In general, according to the operation mechanism of the chip select signal line eSPI_CS, the master device 10 can only select a single slave device for the communication. However, in the bus system 1, only one of the slave devices 14A through 14D is able to respond to the master device 10 at a time slot based on the arbitration mechanism. Therefore, when the master device 10 still operates with a one-to-one communication mechanism, the bus 12 can connect the slave devices 14A through 14D to perform the communication in response to the chip select signal line eSPI_CS, thereby increasing the expandability of the bus system 1.

In FIG. 2, the slave devices 14A through 14D include the address section selection pin 18A through 18D, the address entry selection pin 16A through 16D and the alert handshake pins Alert_1 through Alert_4. The addresses corresponding to the slave devices 14A through 14D can be assigned according to a combination of the voltage levels received by the address section selection pins 18A through 18D and the address entry selection pins 16A through 16D, so that the slave devices 14A through 14D can have different address sections. For example, the address section selection pins 18A and 18C of the slave devices 14A and 14C are coupled to a ground GND, so as to correspond to a first address section. The address entry selection pins 16A and 16C of the slave devices 14A and 14C are coupled to the ground GND and a power supply VDD, so as to respectively correspond to the different address entry codes. For example, they may respectively correspond to a first address and a second address of the first address section. Furthermore, the address section selection pins 18B and 18D of the slave devices 14B and 14D are coupled to the power supply VDD, so as to correspond to a second address section. The address entry selection pins 16B and 16D of the slave devices 14B and 14D are coupled to the ground GND and the power supply VDD, so as to respectively correspond to the different address entry codes. For example, they may respectively correspond to a first address and a second address of the second address section.

The alert handshake pins Alert_1 through Alert_4 of the slave devices 14A through 14D are electrically connected to the alert-handshake control line ALERT_HAND.

In such embodiment, the alert-handshake control line ALERT_HAND is electrically connected to the power supply VDD through a pull-up resistor R, so that the alert-handshake control line ALERT_HAND is at a high-voltage level (e.g., a high logic signal "H"). Moreover, according to the individual clock signals of the slave devices 14A through 14D, the scheduling controllers 145A through 145D of the slave devices 14A through 14D can pull the corresponding alert handshake pins Alert_A through Alert_D to a low-voltage level (e.g., a low logic signal "L") for driving the alert-handshake control line ALERT_HAND, so that the alert-handshake control line ALERT_HAND is at a low-voltage level. Thus, each of the slave devices 14A through 14D can obtain the right to actively communicate with the master device 10 by controlling the voltage level of the alert-handshake control line ALERT_HAND. The alert handshake pins Alert_1 through Alert_4 are the bi-directional input/output pins, and the alert handshake pins Alert_1 through Alert_4 are operating as an open drain in the output mode.

In some embodiments, the alert-handshake control line ALERT_HAND is electrically connected to the ground GND through a pull-down resistor, so that the alert-handshake control line ALERT_HAND is at a low-voltage level (e.g., a low logic signal "L"). Therefore, according to the individual clock signals of the slave devices 14A through 14D, the scheduling controllers 145A through 145D in the slave devices 14A through 14D can control the corresponding alert handshake pins Alert_1 through Alert_4 to be at a high voltage level (e.g., a high logic signal "H"), so as to drive the alert-handshake control line ALERT_HAND, so that the alert-handshake control line ALERT_HAND is at a high voltage level. Thus, each of the slave devices 14A through 14D can obtain the right to actively communicate with the master device 10 by controlling the voltage level of the alert-handshake control line ALERT_HAND.

In the bus system 1, through the clock phase adjustment modules 142A through 142D, the slave devices 14A through 14D respectively have clock signals of the same period (same frequency) and different phases. Therefore, the slave devices 14A through 14D drive the alert-handshake control line ALERT_HAND according to their respective clock signals, so as to communicate with the master device 10 via the bus 12. To simplify the description, the clock generators within the slave devices 14A through 14D are omitted.

Figure 3:
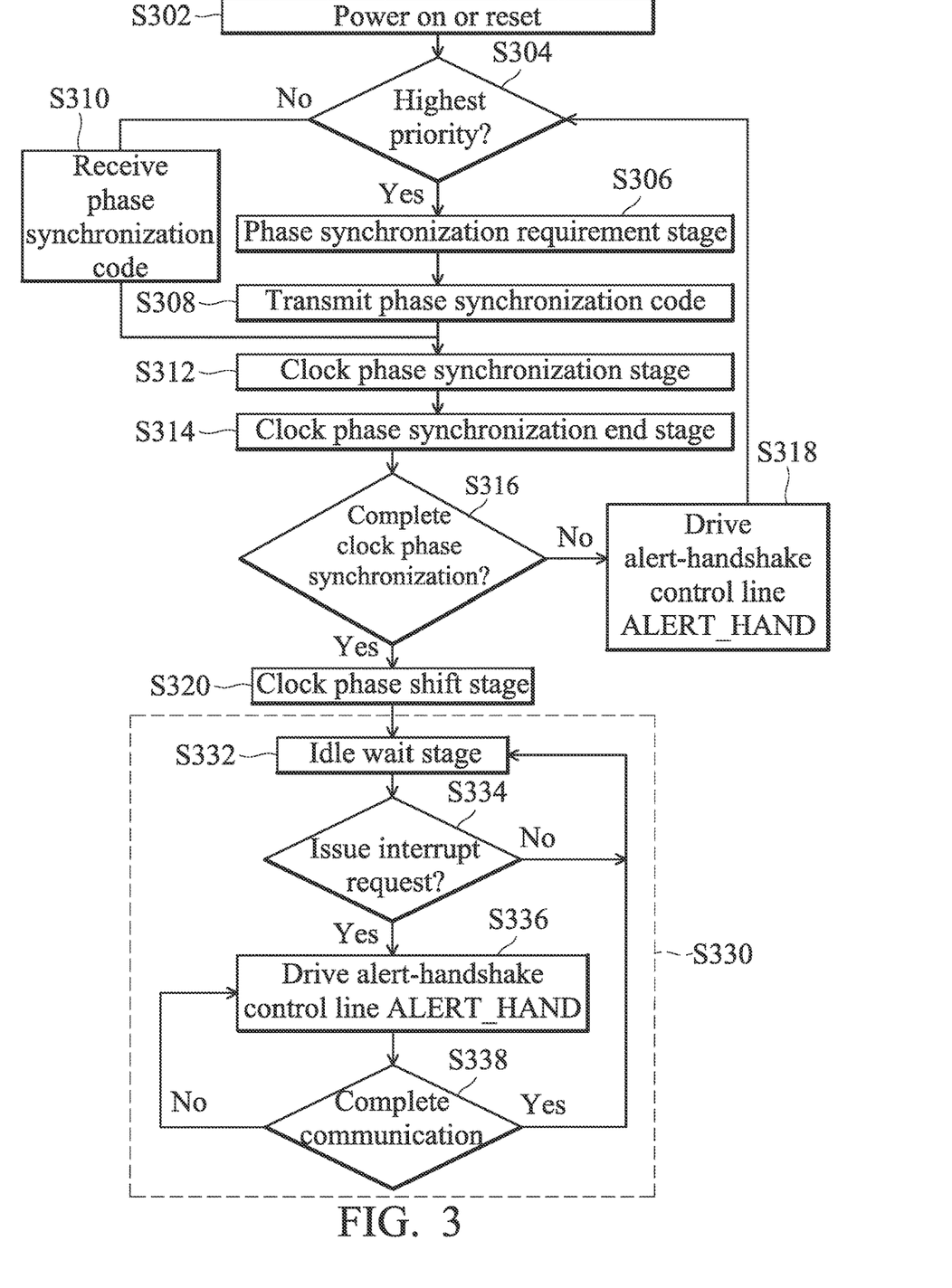
FIG. 3 shows a flowchart of a clock phase shift scheduling control method of the bus system according to some embodiments of the invention.

FIG. 3 shows a flowchart of a clock phase shift scheduling control method 300 of the bus system 1 according to some embodiments of the invention. The clock phase shift scheduling control method of FIG. 3 can be implemented by the scheduling controllers 145A through 145D and the clock phase adjustment modules 142A through 142D of the slave devices 14A through 14D in the bus system 1.

First, when the slave devices 14A through 14D are powered on or reset (step S302), the scheduling controllers 145A through 145D are configured to determine whether the slave device has the highest priority for communicating with the master device 10 (step S304). If the slave device has the highest priority, the slave device is configure to drive the alert-handshake control line ALERT_HAND, so as to notify the other slave devices to enter the phase synchronization requirement stage Phase_Sync (step S306). Next, in the synchronization code stage Sync_Code, the slave device with the highest priority is configured to transmit the phase synchronization code to the other slave devices via the alert-handshake control line ALERT_HAND (step S308). Conversely, if the slave device does not have the highest priority, the slave device is configured to receive the phase synchronization code from the alert-handshake control line ALERT_HAND in the synchronization code stage Sync_Code (step S310). Next, in the clock phase synchronization stage ClockPhase_Sync, the slave device with the highest priority is configured to transmit its own clock signal to the other slave devices via the alert-handshake control line ALERT_HAND (step S312). At the same time, according to the clock signal from the alert-handshake control line ALERT_HAND, the other slave devices are configured to synchronize their own clock signal with the received clock signal. Next, the slave devices 14A through 14D are configured to enter the clock phase synchronization end stage ClockPhase_SyncEnd (step S314).

Next, it is determined whether all slave devices 14A through 14D have completed the clock phase synchronization operation (step S316). If some of the slave devices have not completed the clock phase synchronization operation, the slave devices are configured to drive the alert-handshake control line ALERT_HAND (step S318), so as to notify the other slave devices. Next, the process of the clock phase shift scheduling control method 300 will return to step S304 until all slave devices complete the clock phase synchronization operation. In some embodiments, if some of the slave devices have not completed the clock phase synchronization operation, the process of the clock phase shift scheduling control method 300 will return to step S306, S308 or S312.

Figure 4:
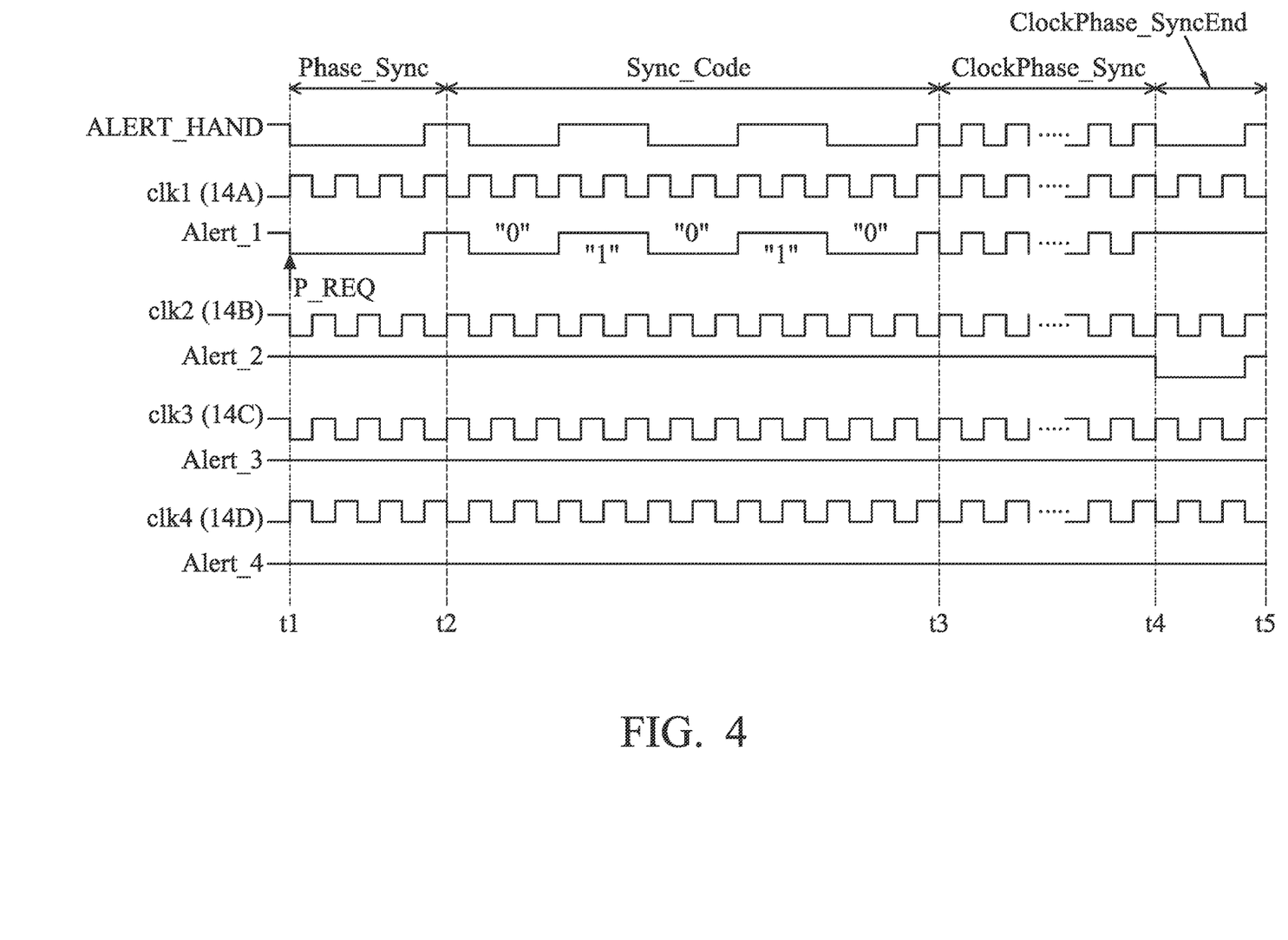
FIG. 4 shows exemplary signal waveforms of the clock signals clk1 through clk4 of the slave devices and the alert-handshake control line ALERT_HAND, to illustrate a state of the clock phase shift scheduling control method of FIG. 3 in which the clock phase shift operation was unsuccessful.

FIG. 4 shows exemplary signal waveforms of the clock signals clk1 through clk4 of the slave devices 14A through 14D and the alert-handshake control line ALERT_HAND, to illustrate a state of the clock phase shift scheduling control method of FIG. 3 in which the clock phase shift operation was unsuccessful. In addition, the waveforms of the clock signals clk1 through clk4 and the alert-handshake control line ALERT_HAND shown in FIG. 4 are only examples and are not intended to limit the invention.

In FIG. 4, it is assumed that the slave device 14A has the highest priority for communicating with the master device 10. In some embodiments, for the slave devices, the priority order of communication with the master device 10 is set by the address section selection pins 18A through 18D, the address entry selection pins 16A-16D, or the registers.

At time point t1, in response to the interrupt request P_REQ, the scheduling controller 145A of the slave device 14A is configured to drive the alert-handshake control line ALERT_HAND (e.g., controlling the alert-handshake control line ALERT_HAND to change from a high voltage level to a low voltage level), so as to notify the slave devices 14B through 14D to enter the phase synchronization requirement stage Phase_Sync (step S306). It should be noted that the number of clock cycles that the alert-handshake control line ALERT_HAND is driven in the phase synchronization requirement stage Phase_Sync is only an example, and is not intended to limit the invention.

At time point t2, the scheduling controller 145A is configured to control the alert-handshake control line ALERT_HAND to transmit the phase synchronization code "01010" to the slave devices 14B through 14D in the synchronization code stage Sync Code (step S308). It should be noted that since the clock signals of the slave devices 14A through 14D are still not synchronized at this time (for example, the phase of the clock signal clk4 of the slave devices 14D is the same as the phase of the clock signal clk1 of the slave device 14A, and the phases of the clock signals clk2 and clk3 of the slave devices 14B and 14C are different from the phase of the clock signal clk1 of the slave device 14A), so each bit of the phase synchronization code needs to be transmitted and maintained for two clock cycles of the clock signal clk1, so as to ensure that each slave device can receive the phase synchronization code "01010". It should be noted that the number of bits and the data value of the phase synchronization code "01010" are only examples and are not intended to limit the invention. In some embodiments, the number of bits of the phase synchronization code may be determined by the number of slave devices. For example, when the number of slave devices increases, the number of bits of the phase synchronization code also increases.

At time point t3, the scheduling controller 145A is configured to transmit the clock signal clk1 to the slave devices 14B through 14D via the alert-handshake control line ALERT_HAND in the clock phase synchronization stage ClockPhase_Sync. Therefore, the clock phase adjustment modules 142B through 142D of the slave devices 14B through 14D are configured to adjust their own clock signals based on the clock signal clk1, so that their own clock signals can be synchronized with the clock signal clk1 in the alert-handshake control line ALERT_HAND.

In some embodiments, the slave devices 14A through 14D may perform the synchronization operation again according to specific conditions, to re-synchronize and re-shift phase of the clock signals clk1 through clk4, so as to avoid the offset of the clock signal caused by factors such as voltage and temperature, which will affect the operation of the bus system 1.

In some embodiments, the slave devices 14A through 14D are configured to adjust the clock signals clk1 through clk4 based on the clock signal eSPI_CLK of the bus 12. For example, after the bus system 1 is powered on, only the slave device 14A with the highest priority can communicate with the master device 10 via the bus 12. At this time, each slave device is configured to use the clock signal eSPI_CLK for synchronization, so as to achieve the effect of continuous synchronization, thus avoiding the offset of the clock signal caused by factors such as voltage and temperature fluctuations. In such embodiment, the frequency of the clock signals of the slave devices are the same as the clock signal eSPI_CLK.

At time point t4, the slave devices 14A through 14D are configured to enter the clock phase synchronization end stage ClockPhase_SyncEnd. Since the slave device 14B has not completed the clock phase synchronization operation, the scheduling controller 145B of the slave devices 14B is configured to drive the alert-handshake control line ALERT_HAND (e.g., controlling the alert-handshake control line ALERT_HAND to change from a high voltage level to a low voltage level), so as to inform the slave devices 14A, 14C and 14D that the synchronization operation has not completed. As described above, since the clock signals of the slave devices 14A through 14D are still not synchronized at this time, the scheduling controller 145B need to drive the alert-handshake control line ALERT_HAND for two clock cycles of the clock signal clk2, to ensure that the slave devices 14A, 14C and 14D can know that the other slave device has not completed the phase synchronization. Therefore, at time point t5, the clock phase synchronization end stage ClockPhase_SyncEnd will end, and the slave devices 14A through 14D will re-perform the phase synchronization operation until the clock phase synchronization operation is completed.

Referring back to FIG. 3, in step S316, if the slave devices 14A through 14D complete the clock phase synchronization operation, then except the slave device with the highest priority, each of the slave devices is configured to adjust its own clock signal to the corresponding phase according to the preset phase value in the clock phase shift stage ClockPhase_Shift (step S320).

After the clock phase shift stage ClockPhase_Shift (step S320), all the slave devices are configured to complete the phase synchronization operation and the phase shift operation of the clock signals. Therefore, all slave devices will have the same frequency and different phase clock signals respectively. Next, the slave devices are configured to perform the scheduling operation S330 according to the individual clock signals, so as to communicate with the master device 10.

In the idle wait stage IdleWait (step 5332) of the sorting operation 5330, each of the scheduling controllers 145A through 145D of the slave devices 14A through 14D is configured to control the corresponding alert handshake pins Alert_1 through Alert_4 to be the input mode, so as to monitor whether the alert-handshake control line ALERT_HAND is driven by any of the slave devices 14A through 14D, for example, the alert-handshake control line ALERT_HAND is changed from a high voltage level to a low voltage level.

Figure 5:
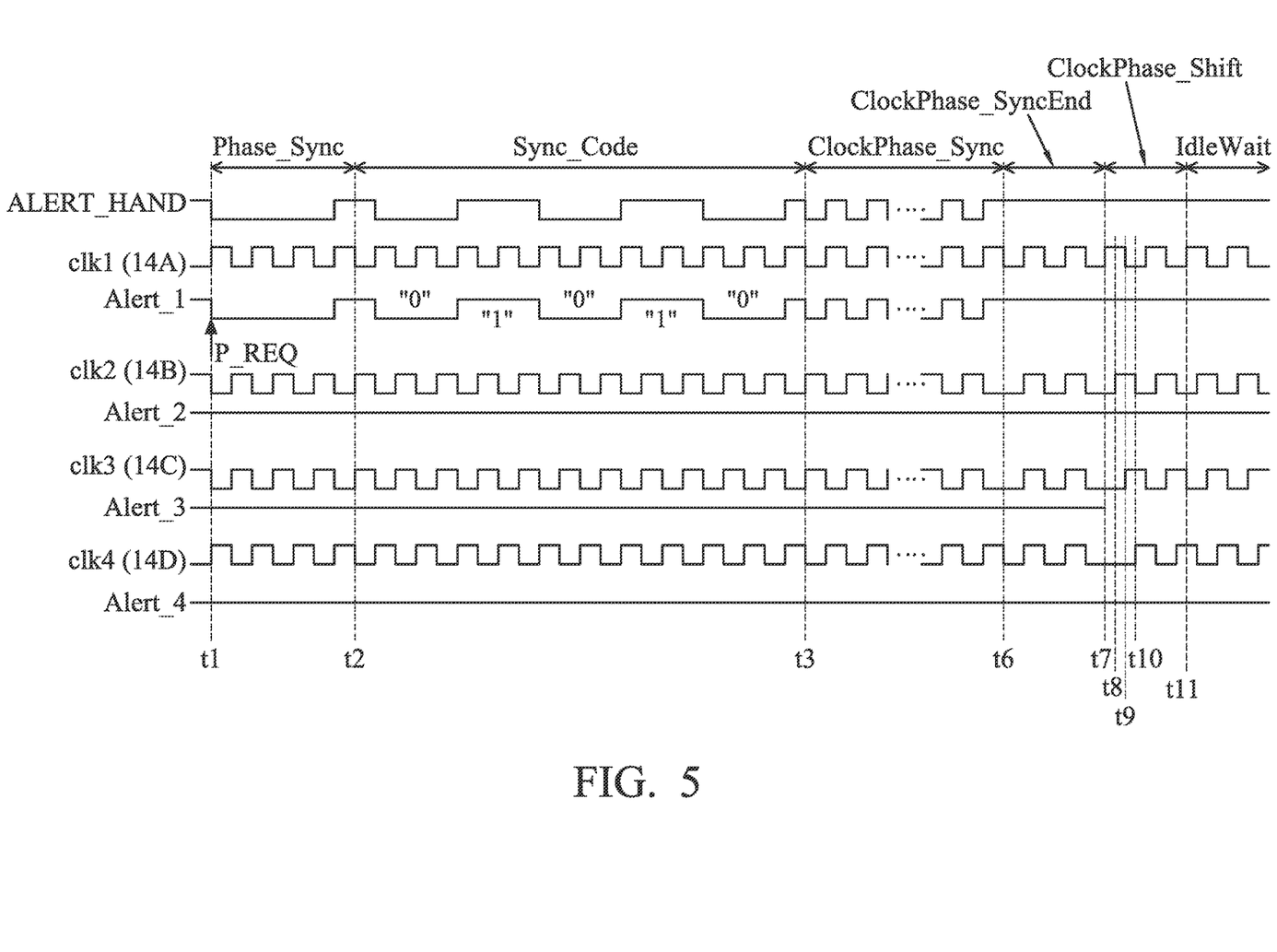
FIG. 5 shows exemplary signal waveforms of the clock signals clk1 through clk4 of the slave devices and the alert-handshake control line ALERT_HAND, to illustrate a state of the clock phase shift scheduling control method of FIG. 3 in which the clock phase shift operation is successful.

FIG. 5 shows exemplary signal waveforms of the clock signals clk1 through clk4 of the slave devices 14A through 14D and the alert-handshake control line ALERT_HAND, to illustrate a state of the clock phase shift scheduling control method of FIG. 3 in which the clock phase shift operation is successful. The phase synchronization requirement stage Phase_Sync, the synchronization code stage Sync_Code and the clock phase synchronization stage ClockPhase_Sync in FIG. 5 are the same as those in FIG. 4. Moreover, the waveforms of the clock signals clk1 through clk4 and the alert-handshake control line ALERT_HAND shown in FIG. 5 are only examples and are not intended to limit the invention.

At time point t6, the slave devices 14A through 14D are configured to enter the clock phase synchronization end stage ClockPhase_SyncEnd. Since the slave devices 14B through 14D have completed the clock phase synchronization operation, the slave devices 14B through 14D will not drive the alert-handshake control line ALERT_HAND. In addition, in the clock phase synchronization end stage ClockPhase_SyncEnd, the clock signals clk2 through clk4 of the slave devices 14B through 14D are synchronized with the clock signal clk1 of the slave devices 14A. Next, at time point t7, the slave devices 14A through 14D are configured to enter the clock phase shift stage ClockPhase_Shift. In the clock phase shift stage ClockPhase_Shift, the slave devices 14A through 14D are configured to shift the phases of clock signals according to their respective priority order. In such embodiment, when it wants to communicate with the master device 10 (e.g., in the idle wait stage IdleWait), the slave device 14A has the first priority (i.e., the highest priority), the slave device 14B has the second priority, the slave device 14C has the third priority and the slave device 14D has the fourth priority (i.e., the lowest priority). Furthermore, in such embodiment, the phase shifts from the slave device of the first priority to the slave device of the fourth priority are respectively 0°, 90°, 180°, and 270°, as shown at time points t7, t8, t9, and t10. Specifically, the phase difference between the clock signal clk1 of the slave device 14A and the clock signal clk2 of the slave device 14B is 90° (i.e., a specific phase difference), and the phase difference between the clock signal clk1 of the slave device 14A and the clock signal clk3 of the device 14C is 180° (i.e., twice the specific phase difference), and the phase difference between the clock signal clk1 of the slave device 14A and the clock signal clk4 of the slave device 14D is 270° (i.e., three times the specific phase difference). In such embodiment, the specific phase difference is determined by the number of slave devices 14A through 14D, e.g., 360°/4=90°. In other words, the clock phase adjustment modules 142B through 142D of the slave devices 14B through 14D are configured to adjust the phases of the respective clock signals according to the clock signal clk1. Moreover, the phase differences between the clock signals clk2 through clk4 and the clock signal clk1 is the integer multiple of the specific phase difference. In the slave devices 14B through 14D, the clock signal clk2 and the clock signal clk1 have the smallest phase difference, and the clock signal clk4 and the clock signal clk1 have the largest phase difference. In other words, among the slave devices 14B through 14D, the slave device 14B has the highest priority, and the slave device 14D has the lowest priority. Next, at time point t11, the slave devices 14A through 14D are configured to enter the idle wait stage IdleWait of the scheduling operation S330 from the clock phase shift stage ClockPhase_Shift.

Referring back to the scheduling operation S330 in FIG. 3, after the idle wait stage IdleWait (step S332), each slave device can decide whether to issue an interrupt request REQ to request communication with the master device 10 via the bus 12 (step S334). If no communication with the master device 10 is required, the slave device is configured to return to the idle wait stage IdleWait. If it is necessary to communicate with the master control device 10 (e.g., the eSPI communication), the slave device is configured to drive the alert-handshake control line ALERT_HAND according to its clock signal to notify other slave devices (step S336) until the communication is completed (step S338). In the idle wait stage IdleWait, the slave device with higher priority can drive the alert-handshake control line ALERT_HAND sooner. Therefore, after detecting that the alert-handshake control line ALERT_HAND is driven, the slave device with lower priority will not control the corresponding alert handshake pin to drive the alert-handshake control line ALERT_HAND. Once the communication with the master element 10 is completed, the slave device with higher priority is configured to stop driving the alert-handshake control line ALERT_HAND. At the same time, if there are other slave devices that have interrupt request REQ, the slave device is configured to drive the alert-handshake control line ALERT_HAND according to its own clock signal. Next, when it is detected that the alert-handshake control line ALERT_HAND is not driven, all slave devices will return to the idle wait stage IdleWait (step S332).

Figure 6:
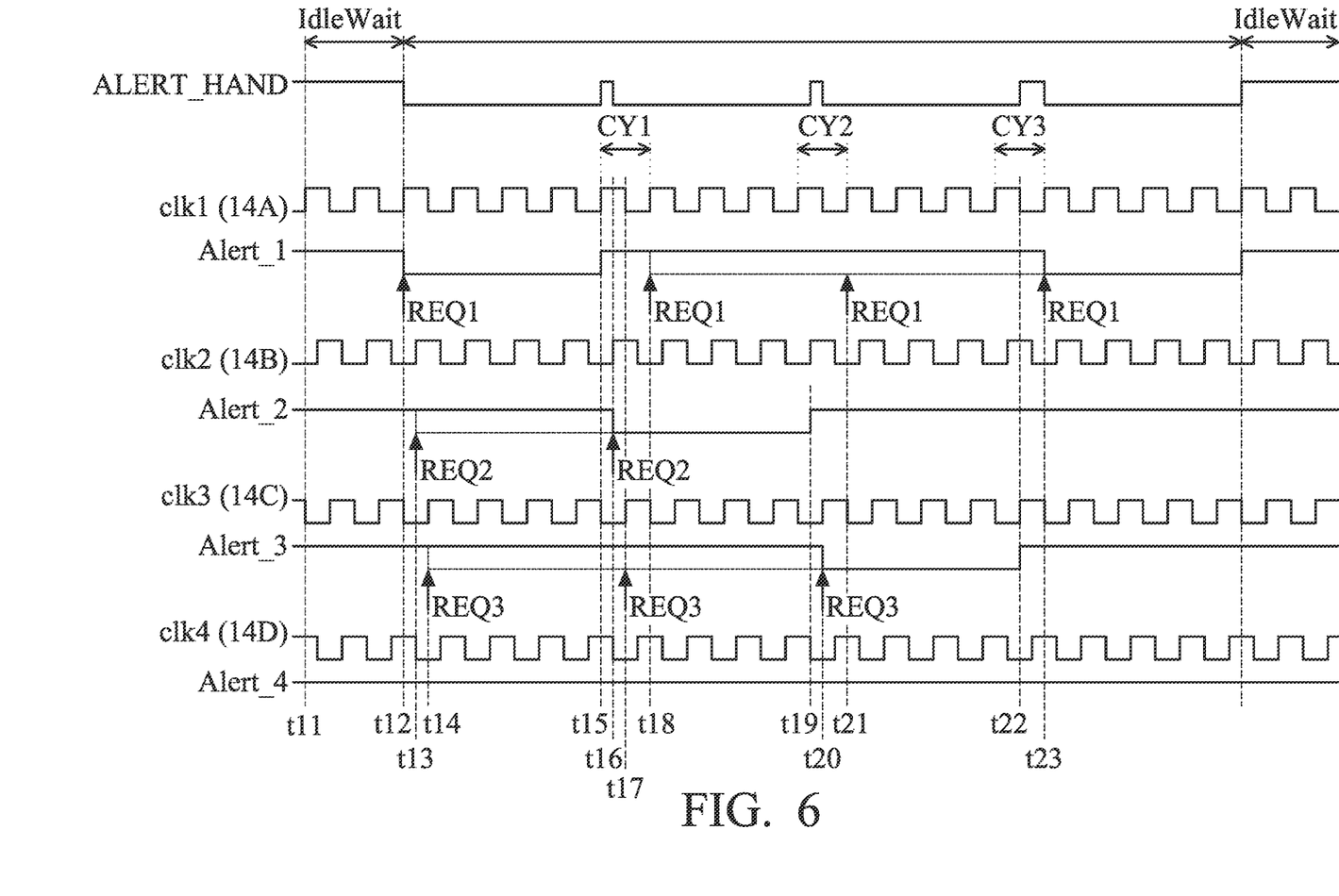
FIG. 6 shows exemplary signal waveforms of the clock signals clk1 through clk4 of the slave devices and the alert-handshake control line ALERT_HAND, to illustrate the scheduling operation in the clock phase shift scheduling control method of FIG. 3.

FIG. 6 shows exemplary signal waveforms of the clock signals clk1 through clk4 of the slave devices 14A through 14D and the alert-handshake control line ALERT_HAND, to illustrate the scheduling operation S330 in the clock phase shift scheduling control method of FIG. 3. In addition, the waveforms of the clock signals clk1 through clk4 and the alert-handshake control line ALERT_HAND shown in FIG. 6 are only examples and are not intended to limit the invention.

As described above, at time t11, the slave devices 14A through 14D are configured to enter the idle wait stage IdleWait.

In such embodiment, the slave devices 14A through 14C need to communicate with the master device 10. Therefore, in response to the interrupt request REQ, the slave devices 14A through 14C request to communicate with the master device 10 through the bus 12 according to the respective clock signals clk1 through clk3.

At time point t12, since the slave device 14A has the highest priority, the slave device 14A is configured to drive the alert-handshake control line ALERT_HAND in response to the interrupt request REQ1, so as to communicate with the master device 10 via the bus 12. Then, the slave devices 14B and 14C will detect that the alert-handshake control line ALERT_HAND is driven. Therefore, the slave devices 14B and 14C will not drive the alert-handshake control line ALERT_HAND at time points t13 and t14. After completing the communication with the master device 10, the slave device 14A is configured to stop driving the alert-handshake control line ALERT_HAND at time point t15.

After the slave device 14A stops driving the alert-handshake control line ALERT_HAND, the slave devices 14B through 14D are configured to detect that the alert-handshake control line ALERT_HAND is not driven. Next, at time point t16, the slave device 14B is configured to drive the alert-handshake control line ALERT_HAND in response to the interrupt request REQ2, so as to communicate with the master device 10 via the bus 12. Since the alert-handshake control line ALERT_HAND is driven, the slave device 14C will not drive the alert-handshake control line ALERT_HAND at time point t17. Moreover, it should be noted that because the slave device 14A with the highest priority has passed the phase that can drive the alert-handshake control line ALERT_HAND in the cycle CY1 of the clock signal clk1, only the slave devices 14B through 14D with lower priority can detect that the alert-handshake control line ALERT_HAND is not driven. Therefore, the slave devices 14B through 14D with lower priority can raise the interrupt request REQ. Specifically, when a plurality of the slave devices need to communicate with the master device 10 through the bus 12 at the same time, by using the clock signals with different phases, the bus 12 can be prevented from always being used by the slave devices with the higher priority, thereby affecting the use rights of other slave devices with lower priority to communicate with the master device 10. In other words, the slave device 14A will detect that the alert-handshake control line ALERT_HAND is driven, so the slave device 14A will not drive the alert-handshake control line ALERT_HAND at time point t18.

After completing the communication with the master device 10, the slave device 14B is configured to stop driving the alert-handshake control line ALERT_HAND at time point t19. After the slave device 14B stops driving the alert-handshake control line ALERT_HAND, the slave device 14C is configured to drive the alert-handshake control line ALERT_HAND at the time point t20 in response to the interrupt request REQ3, so as to communicate with the master device 10 via the bus 12. Similarly, since the slave device 14A with the highest priority has passed the phase that can drive the alert-handshake control line ALERT_HAND in the cycle CY2 of the clock signal clk1, the slave device 14A will detect the alert-handshake control line ALERT_HAND is driven, so the alert-handshake control line ALERT_HAND will not be driven at time point t21.

After completing the communication with the master device 10, the slave device 14C is configured to stop driving the alert-handshake control line ALERT_HAND at time point t22. Since the slave device 14D does not drive the alert-handshake control line ALERT_HAND in the period CY3 of the clock signal clk1, the slave device 14A is configured to drive the alert-handshake control line ALERT_HAND at the time point t23 to communicate with the master device 10. Next, after completing the communication with the master device 10, the slave device 14A is configured to stop driving the alert-handshake control line ALERT_HAND. If no other slave device continues to drive the alert-handshake control line ALERT_HAND, the slave devices 14A through 14D are configured to enter the idle wait phase IdleWait.

In the embodiments of the invention, the alert-handshake control line ALERT_HAND is used to perform clock phase synchronization and clock phase shift operations without adding additional pins, so as to schedule the priority of each of the slave devices to use the bus 12 to communicate with the master device 10. In addition, by adjusting the phase difference of the clock signals of the slave devices, the right to drive the alert-handshake control line ALERT_HAND can be given to the slave devices with lower priority first. Thus, it can be avoided that the slave devices with higher priority always occupy the bus 12 to communicate with the master device 10. Moreover, compared with the traditional bus system that needs to drive the alert-handshake control line ALERT_HAND in a priority order, in the embodiments of the invention, the slave devices with interrupt requests can drive the alert-handshake control line ALERT_HAND within the same cycle (e.g., the cycles CY1, CY2 and CY3) of the clock signal after detecting that the alert-handshake control line ALERT_HAND is not driven, thus improving the communication efficiency with the master device. Thus, the bus system 1 can have faster response speed and more flexible response policies for emergencies.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A bus system, comprising:
a master device;
an enhanced serial peripheral interface (eSPI) bus; and
a plurality of slave devices electrically connected to the master device via the eSPI bus, and comprising a first slave device and a plurality of second slave devices,
wherein each of the slave devices has a pin, and the pins of the slave devices are electrically connected together via a control line,
wherein the first slave device is configured to provide a first clock signal to each of the second slave devices via the control line, so that a second clock signal of each of the second slave devices is synchronized with the first clock signal,
wherein after the second clock signals are synchronized with the first clock signal, each of the second slave devices is configured to adjust a phase of the second clock signal in a clock phase shift stage, so that the second clock signal has a phase difference with the first clock signal,
wherein the phase differences between the second clock signals of the second slave devices and the first clock signal are different.

2. The bus system as claimed in claim 1, wherein the phase difference between the second clock signal of each of the second slave devices and the first clock signal is an integer multiple of a specific phase difference.

3. The bus system as claimed in claim 2, wherein the specific phase difference is determined by a number of the slave devices.

4. The bus system as claimed in claim 1, wherein the slave devices are configured to determine whether to communicate with the master device via the eSPI bus by driving the control line.

5. The bus system as claimed in claim 4, wherein in an idle wait stage, the first slave device has a highest priority among the plurality of slave devices for communicating with the master device.

6. The bus system as claimed in claim 5, wherein in the idle wait stage, a priority of the communication between the second slave devices and the master device is determined by the phase differences between the second clock signals and the first clock signal.

7. The bus system as claimed in claim 6, wherein in the idle wait stage, the phase difference between the first clock signal and the second clock signal of the second slave device with the highest priority for communicating with the master device is smaller than the phase differences between the first clock signal and the second clock signals of the other second slave devices.

8. The bus system as claimed in claim 6, wherein the phase difference between the first clock signal and the second clock signal of the second slave device with the lowest priority for communicating with the master device is bigger than the phase differences between the first clock signal and the second clock signals of the other second slave devices.

9. The bus system as claimed in claim 1, wherein before the first slave device provides the first clock signal to the second slave devices via the control line, the first slave device is configured to further provide a phase synchronization code to the second slave devices via the control line, wherein the phase synchronization code has a plurality of bits.

10. A bus system, comprising:
a master device;
an enhanced serial peripheral interface (eSPI) bus; and
a plurality of slave devices electrically connected to the master device via the eSPI bus and comprising a first slave device and a plurality of second slave devices,
wherein each of the slave devices has a pin, and the pins of the slave devices are electrically connected together via a control line,
wherein the plurality of slave devices determine whether to communicate with the master device via the eSPI bus by driving the control line;
wherein after the first slave device provides a first clock signal to each of the second slave devices via the control line, each of the second slave devices is configured to control a phase difference between a second clock signal and the first clock signal;
wherein the phase differences between the second clock signals of the second slave devices and the first clock signal are different.

11. The bus system as claimed in claim 10, wherein the first slave device is configured to drive the control line according to the first clock signal, so as to communicate with the master device via the eSPI bus.

12. The bus system as claimed in claim 10, wherein the second slave devices are configured to drive the control line according to the second clock signals with different phase differences, so as to communicate with the master device via the eSPI bus.

13. The bus system as claimed in claim 10, wherein the first slave device is configured to provide the first clock signal to each of the second slave devices via the control line, so that the second clock signal of each of the second slave devices is synchronized with the first clock signal.

14. The bus system as claimed in claim 13, wherein after each of the second clock signals is synchronized with the first clock signal, each of the second slave devices is configured to adjust a phase of the second clock signal in a clock phase shift stage, so that the second clock signal has the phase difference with the first clock signal.

15. The bus system as claimed in claim 10, wherein the phase difference between the second clock signal of each of the second slave devices and the first clock signal is an integer multiple of a specific phase difference.

16. The bus system as claimed in claim 15, wherein the specific phase difference is determined by a number of the plurality of slave devices.

17. The bus system as claimed in claim 10, wherein in an idle wait stage, the first slave device has a highest priority among the plurality of slave devices for communicating with the master device.

18. The bus system as claimed in claim 17, wherein in the idle wait stage, a priority of the communication between the second slave devices and the master device is determined by the phase differences between the second clock signals and the first clock signal.

19. The bus system as claimed in claim 18, wherein in the idle wait stage, the phase difference between the first clock signal and the second clock signal of the second slave device with the highest priority for communicating with the master device is smaller than the phase differences between the first clock signal and the second clock signals of the other second slave devices.

20. The bus system as claimed in claim 18, wherein the phase difference between the first clock signal and the second clock signal of the second slave device with a lowest priority for communicating with the master device is bigger than the phase differences between the first clock signal and the second clock signals of the other second slave devices.

* * * * *